United States Patent [19]
Ho

[11] Patent Number: 5,675,323
[45] Date of Patent: Oct. 7, 1997

[54] METHOD FOR PREVENTING UNAUTHORIZED DUPLICATION OF A REMOTE CONTROLLER, AND REMOTE CONTROLLER WITH COPY-PREVENTING CAPABILITY

[76] Inventor: Kuo-Ping Ho, No. 36, Lane 181, Chung-Hsiao Rd., Yung-Kang City, Tainan Hsien, Taiwan

[21] Appl. No.: 521,143

[22] Filed: Aug. 29, 1995

[51] Int. Cl.⁶ ................................ G06F 1/00; G11B 5/02
[52] U.S. Cl. ........................ 340/825.31; 340/825.34; 340/825.69; 340/825.72; 380/3; 380/5
[58] Field of Search ............. 340/825.31, 825.69, 340/825.72, 825.34; 360/60; 380/3, 5, 10, 9; 348/734

[56] References Cited

U.S. PATENT DOCUMENTS

| | | | |
|---|---|---|---|
| 3,963,865 | 6/1976 | Songer | 178/7.1 |
| 4,040,099 | 8/1977 | Cook | 360/29 |
| 4,785,361 | 11/1988 | Brotby | 360/60 |
| 4,945,563 | 7/1990 | Horton et al. | 380/5 |
| 5,113,438 | 5/1992 | Blokker, Jr. et al. | 380/6 |
| 5,182,680 | 1/1993 | Yamashida et al. | 360/60 |
| 5,237,319 | 8/1993 | Hikada et al. | 340/825.72 |
| 5,537,216 | 7/1996 | Yamashida et al. | 358/335 |

*Primary Examiner*—Michael Horabik
*Assistant Examiner*—Yonel Beaulieu
*Attorney, Agent, or Firm*—Brinks Hofer Gilson & Lione

[57] ABSTRACT

In a method and a remote controller for preventing unauthorized duplication of the remote controller by a copying apparatus, a copy-preventing signal is inserted at a control signal which is generated and transmitted by the remote controller and which is to be received by a corresponding receiver unit for remote control operation of an appliance that is connected to the receiver unit. The copy-preventing signal is inserted at one of the low logic bits of the control signal immediately following a high logic bit of the latter. The combination of the high logic bit and the copy-preventing signal has a duration within a noise threshold of the receiver unit such that the receiver unit can correctly identify the combination of the high logic bit and the copy-preventing signal as a single high logic bit while the copying apparatus misinterprets the combination of the high logic bit and the copy-preventing signal as two high logic bits.

5 Claims, 7 Drawing Sheets

METHOD FOR PREVENTING UNAUTHORIZED DUPLICATION OF A REMOTE CONTROLLER, AND REMOTE CONTROLLER WITH COPY-PREVENTING CAPABILITY

BACKGROUND OF THE INVENTION

1. Field of the Invention

The invention relates to remote controllers, more particularly to a method for preventing unauthorized duplication of a remote controller, and to a remote controller with a copy-preventing capability.

2. Description of the Related Art

Remote controllers are devices used for remotely controlling the operation of automobile locks, garage doors, electrical appliances and the like. Programming apparatus and learning remote controllers have been developed in order to make back-up copies of a remote controller, thereby avoiding the need to replace an entire remote control system when the remote controller thereof is misplaced. Unfortunately, the conventional programming apparatus and learning remote controllers can also be used to make unauthorized copies of a remote controller.

As shown in FIG. 1, an output signal (A), which is transmitted wirelessly by a remote controller, is to be received and processed by a receiver unit so as to obtain a control signal (B) which is used to control the operation of an appliance that is connected to the receiver unit. Since the output signal (A) is essentially a modulated form of the control signal (B), unauthorized duplication and copying of a remote controller can be performed with ease by mere use of a conventional programming apparatus or learning remote controller.

FIG. 2 is a schematic circuit block diagram of a conventional learning remote controller. As shown, the learning remote controller comprises a high-frequency transmitter circuit 11, a keyboard input circuit 12, a data storage circuit 13, an indicator circuit 14, a microprocessor 15, an amplifier circuit 16 and a high-frequency receiver circuit 17. The transmitter circuit 11 serves to transmit wirelessly a control signal. The keyboard input circuit 12 is operated to control transmitting, receiving, reading and writing operations of the microprocessor 15. The data storage circuit 13 provides a medium for reading and writing data. The indicator circuit 14 serves to indicate whether the learning remote controller is operating in a transmitting mode or in a learning mode.

Referring to FIGS. 2 and 3, when the conventional learning remote controller is used to make a copy of an original remote controller, the two remote controllers are placed closed to each other, and the learning remote controller is operated in the learning mode. The receiver circuit 17 of the learning remote controller receives wirelessly the control signal which is transmitted by the original remote controller when a control key of the latter is operated, and the amplifier circuit 16 amplifies the control signal to an extent which enables the microprocessor 15 to discern the same. After identifying the control signal, the microprocessor 15 stores the same in the data storage circuit 13, and the indicator circuit 14 is activated to inform the user that the learning remote controller has successfully completed copying of the control signal.

SUMMARY OF THE INVENTION

The main object of the present invention is to provide a method for preventing unauthorized duplication of a remote controller.

Another object of the present invention is to provide a remote controller with a copy-preventing capability to prevent unauthorized duplication or copying thereof with the use of a conventional copying apparatus, such as a programming apparatus or learning remote controller.

According to one aspect of the present invention, a method for preventing unauthorized duplication of a remote controller by a copying apparatus comprises the step of inserting a copy-preventing signal at one of the low logic bits of a control signal which is generated and transmitted by the remote controller and which is to be received by a corresponding receiver unit for remote control operation of an appliance that is connected to the receiver unit, said one of the low logic bits immediately following one of the high logic bits of the control signal, the combination of said one of the high logic bits and the copy-preventing signal having a duration within a noise threshold of the receiver unit such that the receiver unit can correctly identify the combination of said one of the high logic bits and the copy-preventing signal as a single high logic bit while the copying apparatus misinterprets the combination of said one of the high logic bits and the copy-preventing signal as two high logic bits.

According to another aspect of the present invention, a remote controller is capable of preventing unauthorized duplication thereof by a copying apparatus and comprises processor means for generating a control signal which includes high and low logic bits, and transmitter means for transmitting the control signal for reception by a corresponding receiver unit to permit remote control operation of an appliance that is connected to the receiver unit. The remote controller further comprises means for inserting a copy-preventing signal at one of the low logic bits of the control signal immediately following one of the high logic bits of the control signal prior to transmission of the control signal, the combination of said one of the high logic bits and the copy-preventing signal having a duration within a noise threshold of the receiver unit such that the receiver unit can correctly identify the combination of said one of the high logic bits and the copy-preventing signal as a single high logic bit while the copying apparatus misinterprets the combination of said one of the high logic bits and the copy-preventing signal as two high logic bits. In one embodiment, the signal inserting means is incorporated in the processor means. In another embodiment, the signal inserting means interconnects the processor means and the transmitting means.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
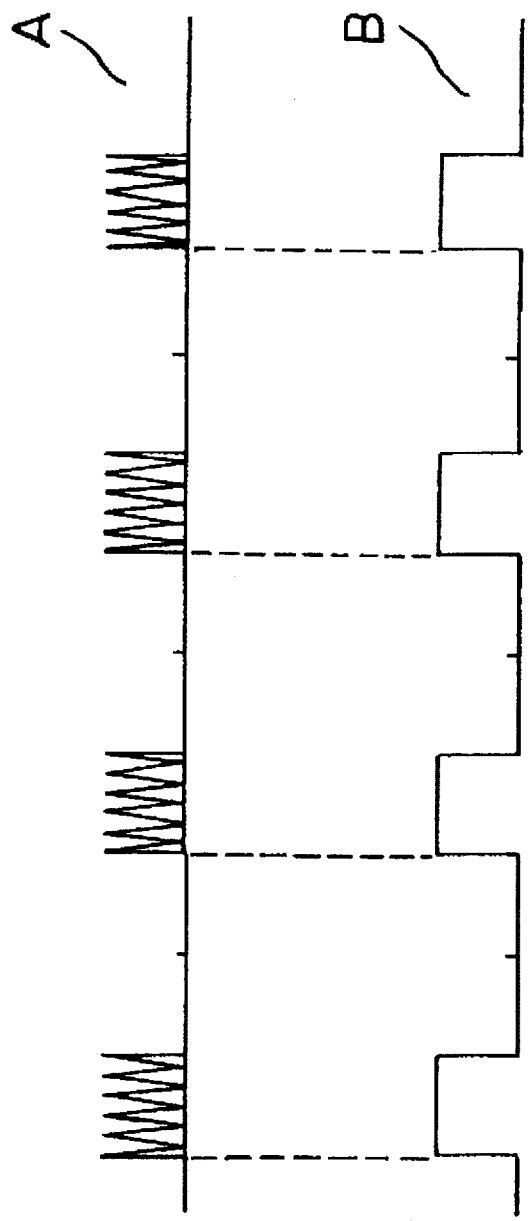
FIG. 1 illustrates an output signal (A), which is transmitted wirelessly by a conventional remote controller and which is to be received by a receiver unit, and a control signal (B) which is obtained by the receiver unit from the output signal (A) and which is used to control the operation of an appliance that is connected to the receiver unit.
Figure 2:
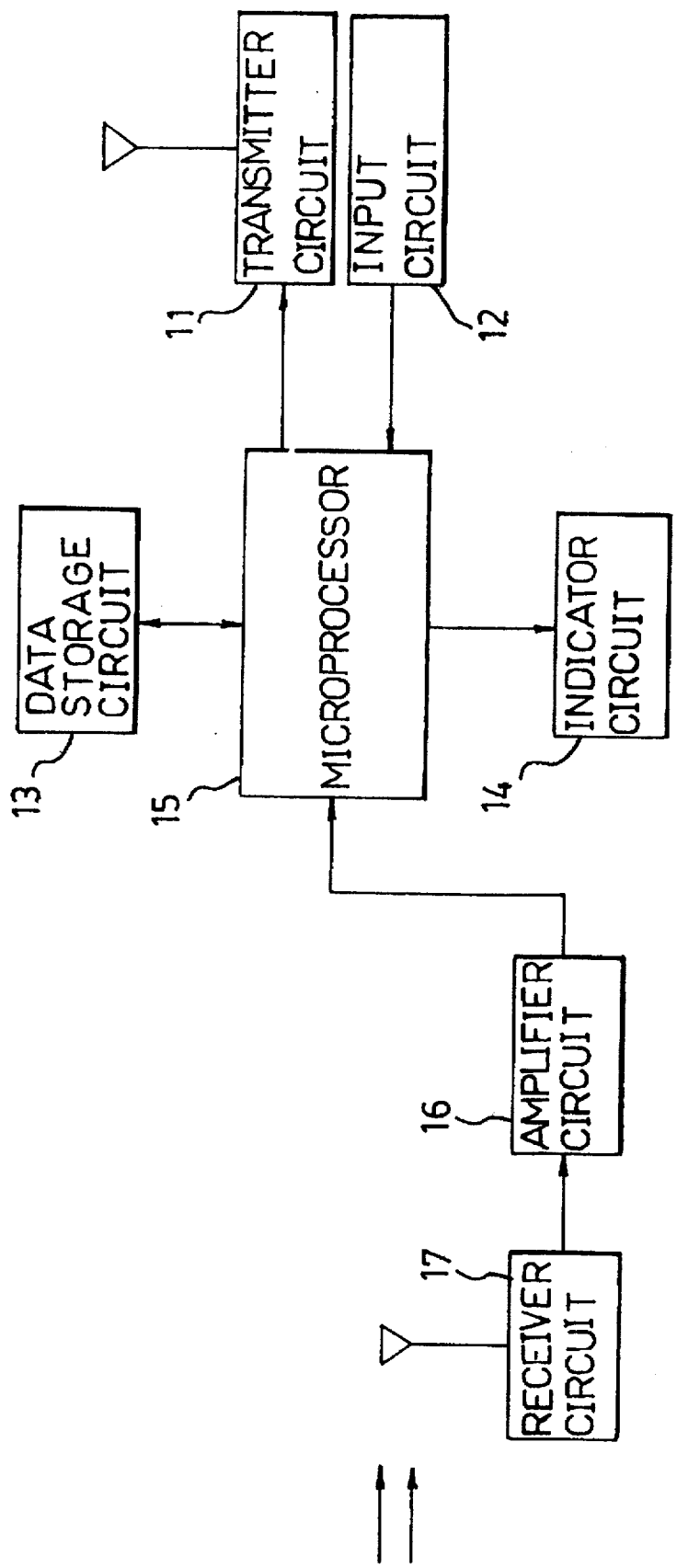
FIG. 2 is a schematic circuit block diagram of a conventional learning remote controller.
Figure 3:
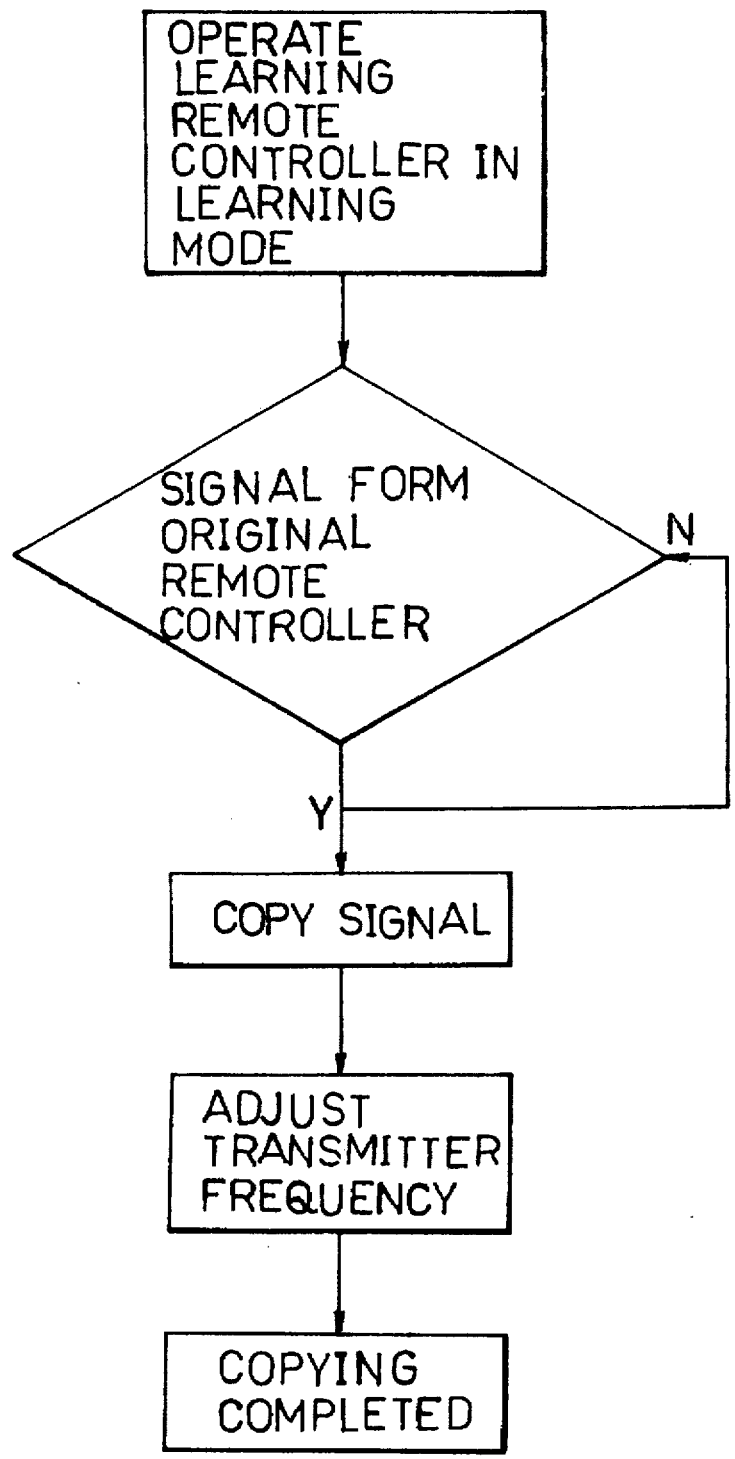
FIG. 3 is a flowchart illustrating a copying operation of the conventional learning remote controller.
Figure 4:
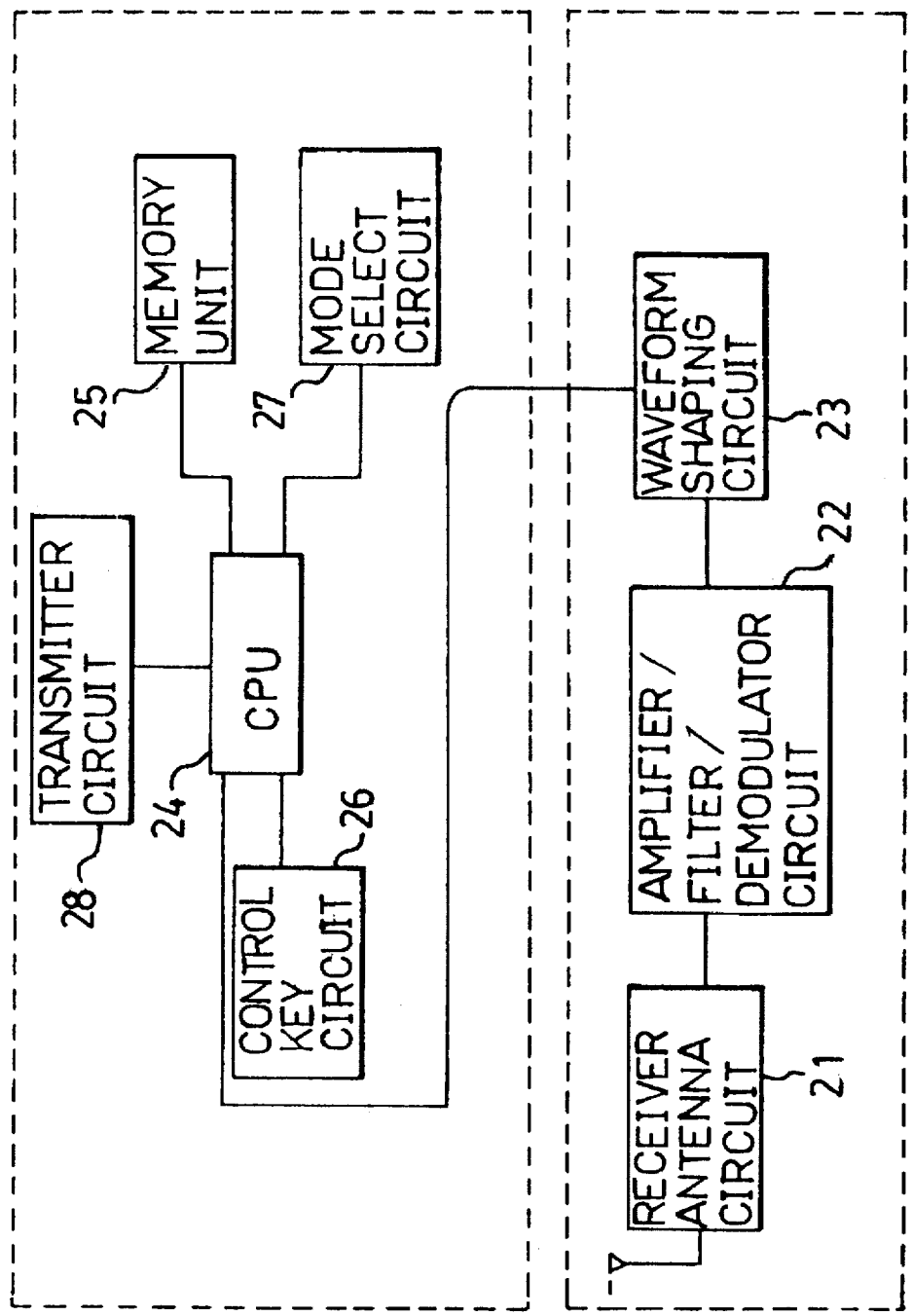
FIG. 4 is a schematic circuit block diagram of the first preferred embodiment of a remote controller with a copy-preventing capability according to the present invention.

Referring to FIG. 4, the first preferred embodiment of a remote controller with a copy-preventing capability according to the present invention is shown to comprise a receiver antenna circuit 21, an amplifier/filter/demodulator circuit 22, a waveform shaping circuit 23, a central processing unit (CPU) 24, a memory unit 25, a control key circuit 26, a mode select circuit 27 and a high-frequency transmitter circuit 28. The receiver antenna circuit 21 is adapted to receive an electromagnetic wave. The amplifier/filter/demodulator circuit 22 is connected to the output end of the receiver antenna circuit 21 and serves to amplify and filter the electrical output of the receiver antenna circuit 21 to remove unwanted frequency signals and to demodulate the filtered electrical output. The waveform shaping circuit 23 is connected to the output end of the amplifier/ filter/ demodulator circuit 22 and converts the electrical output of the latter into a pulse signal. The pulse output of the waveform shaping circuit 23 is provided to the CPU 24 which has been programmed beforehand. The memory unit 25 is connected to the CPU 24 and is used to store data from the CPU 24 therein. The control key circuit 26 is connected to the CPU 24 and is used to control the writing and reading of data in and from prescribed storage regions of the memory unit 25. The mode select circuit 27 is connected to the CPU 24 and is used to activate the CPU 24 to operate in a transmitting mode or in a learning mode. The transmitter circuit 28 is connected to the CPU 24 and serves to modulate a control signal from the CPU 24 to transmit wirelessly the same for reception by a remote receiver circuit.

In the present invention, a copy-preventing signal is added before the control signal can be transmitted by the transmitter circuit 28. In this embodiment, the CPU 24 is programmed with a copy-preventing signal generating routine to achieve this function.

Figure 5:
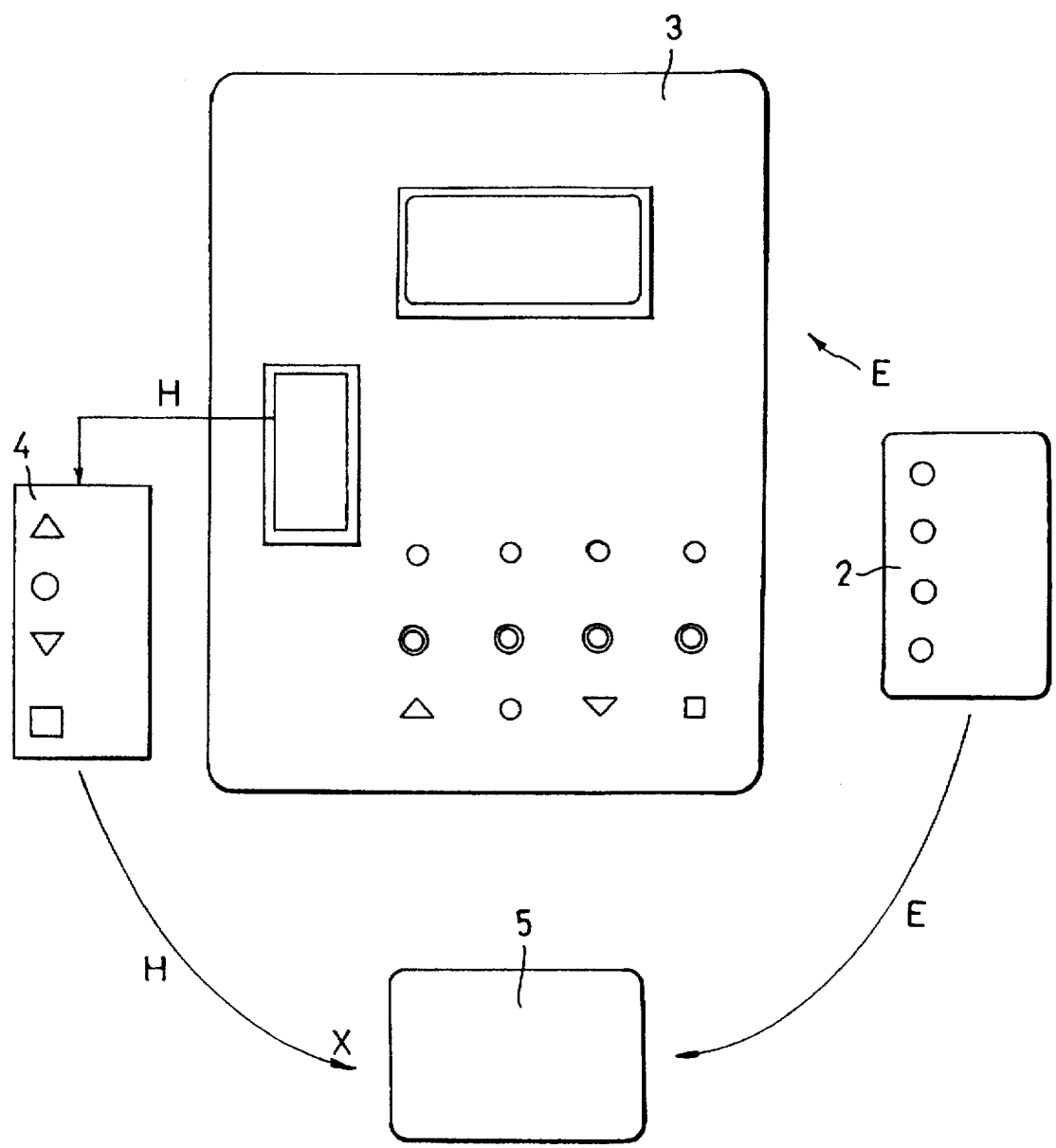
FIG. 5 illustrates how unauthorized duplication of the remote controller of FIG. 4 might be accomplished.
Figure 6:
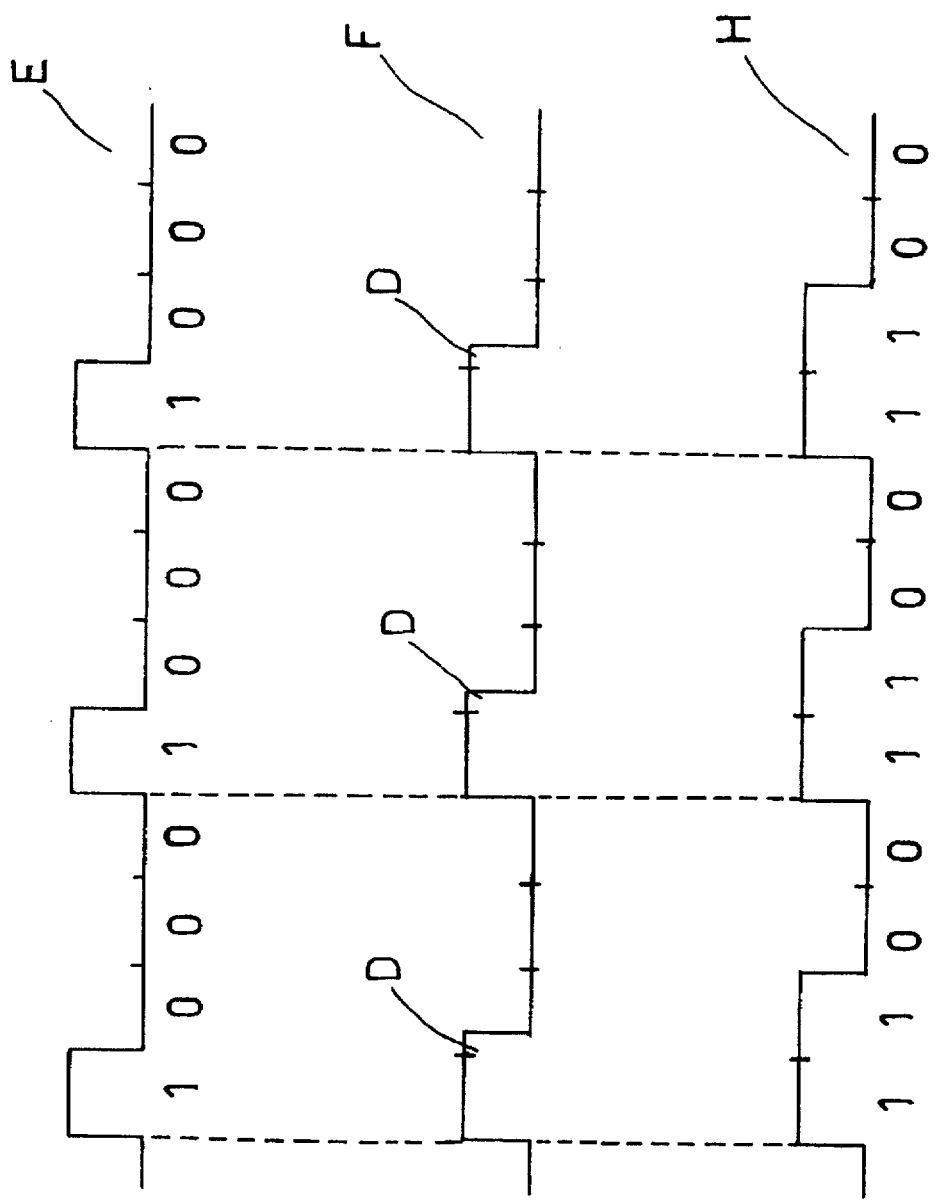
FIG. 6 shows a control signal (E) and a modified control signal (F) from the remote controller of FIG. 4, and a control signal (H) identified by a programming apparatus or a learning remote controller to illustrate how unauthorized duplication of the remote controller of FIG. 4 is prevented.

Referring to FIGS. 5 and 6, assuming that the control signal (E) which is to be transmitted by the remote controller 2 of the present invention is 1000, a copy-preventing signal (D) is inserted at a low logic bit of the control signal (E) which immediately follows a high logic bit of the control signal (E), thereby resulting in a modified control signal (F). In the example shown in FIG. 6, the high logic bit of the control signal (E) has a duration of 30 ms, while the copy-preventing signal (D) has a duration of 5 ms. If the receiver unit 5 corresponding to the remote controller 2 has a noise threshold that ranges from 30 to 50 ms, the combination of the high logic bit and the copy-preventing signal (D) is correctly identified by the receiver unit 5 as a single high logic bit. Thus, the receiver unit 5 considers the copy-preventing signal (D) as a noise signal and is able to recover the original control signal (E) to permit remote control of the operation of an appliance that is connected thereto. However, a conventional programming apparatus 3 or learning remote controller 4 misinterprets the combination of the high logic bit and the copy-preventing signal (D) as two high logic bits since the total duration thereof exceeds 30 ms. Thus, when copying of the original remote controller 2 is initiated with the use of the conventional programming apparatus 3 or learning remote controller 4, the conventional programming apparatus 3 or learning remote controller 4 stores the control signal (H), which is 1100, instead of the control signal (E). Therefore, the learning remote controller 4 and a back-up remote controller programmed by the conventional programming apparatus 3 are not duplicates of the original remote controller 2.

Figure 7:
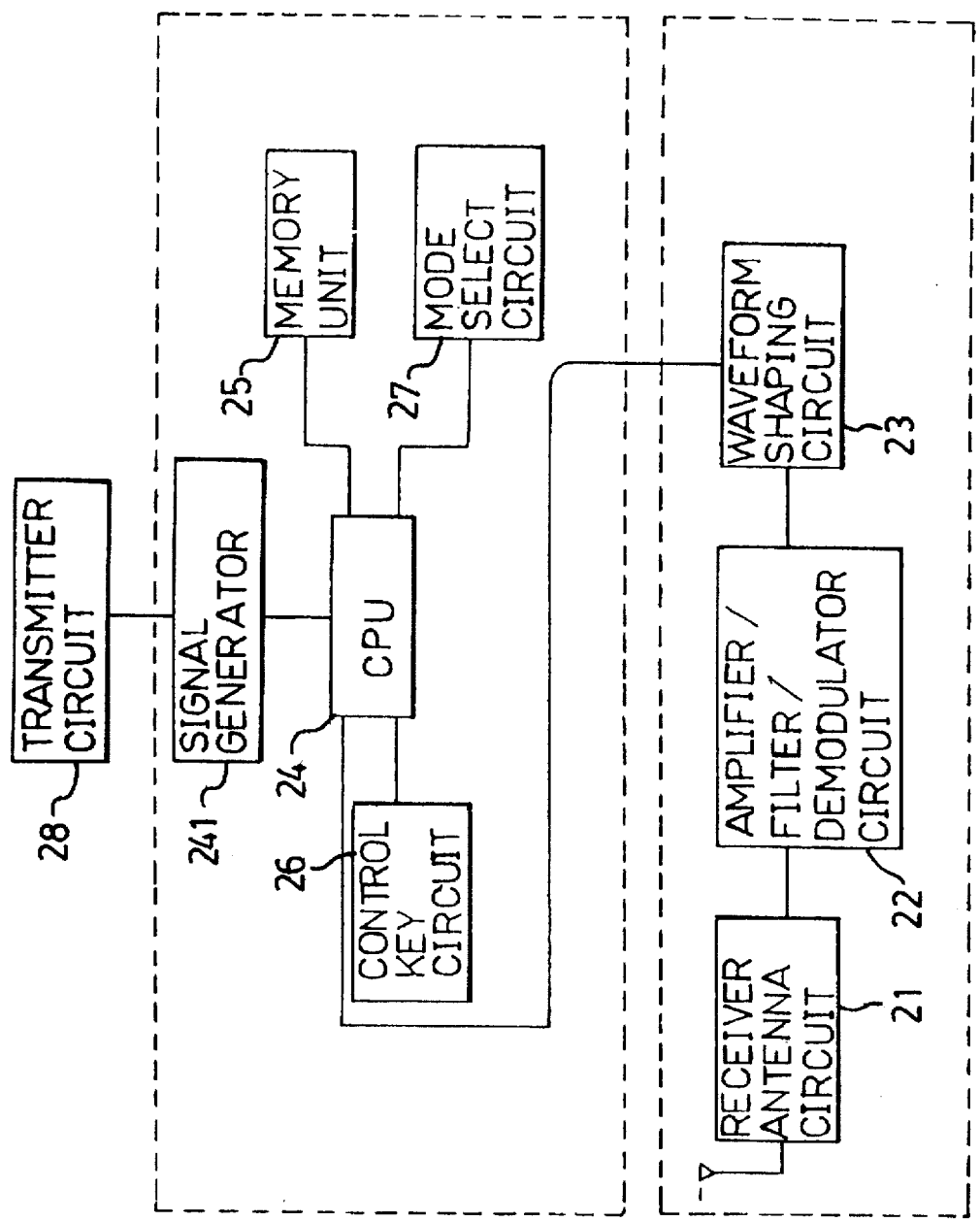
FIG. 7 is a schematic circuit block diagram of the second preferred embodiment of a remote controller with a copy-preventing capability according to the present invention.

FIG. 7 illustrates a remote controller which incorporates the second preferred embodiment of a copy-preventing apparatus according to the present invention. The remote controller of FIG. 7 is similar to that shown in FIG. 4 except that, in the former, the insertion of the copy-preventing signal is performed by a signal generator 241 which interconnects the output end of the CPU 24 and the input end of the transmitter circuit 28. The operation of the second preferred embodiment is similar to that of the previous embodiment and will not be detailed further.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for preventing unauthorized duplication of a remote controller by a copying apparatus, the remote controller including means for generating and transmitting a control signal which includes high and low logic bits and which is to be received by a corresponding receiver unit for remote control operation of an appliance that is connected to the receiver unit, said method comprising the step of:

inserting a copy-preventing signal at one of the low logic bits of the control signal immediately following one of the high logic bits of the control signal, combination of said one of the high logic bits and said copy-preventing signal having a duration within a noise threshold of the receiver unit such that the receiver unit can correctly identify the combination of said one of the high logic bits and said copy-preventing signal as a single high logic bit while the copying apparatus misinterprets the combination of said one of the high logic bits and said copy-preventing signal as two high logic bits.

2. A remote controller for preventing unauthorized duplication thereof by a copying apparatus, said remote controller including means for generating and transmitting a control signal which includes high and low logic bits and which is to be received by a corresponding receiver unit for remote control operation of an appliance that is connected to the receiver unit, wherein:

said remote controller further comprises means for inserting a copy-preventing signal at one of the low logic bits of the control signal immediately following one of the high logic bits of the control signal, combination of said one of the high logic bits and said copy-preventing signal having a duration within a noise threshold of the receiver unit such that the receiver unit can correctly identify the combination of said one of the high logic bits and said copy-preventing signal as a single high logic bit while the copying apparatus misinterprets the combination of said one of the high logic bits and said copy-preventing signal as two high logic bits.

3. A remote controller for preventing unauthorized duplication thereof by a copying apparatus, said remote controller including processor means for generating a control signal which includes high and low logic bits, and transmitter means for transmitting the control signal for reception by a corresponding receiver unit to permit remote control operation of an appliance that is connected to the receiver unit, wherein:

said remote controller further comprises means for inserting a copy-preventing signal at one of the low logic bits of the control signal immediately following one of the high logic bits of the control signal prior to transmission of said control signal, combination of said one of the high logic bits and said copy-preventing signal having a duration within a noise threshold of the receiver unit such that the receiver unit can correctly identify the combination of said one of the high logic bits and said copy-preventing signal as a single high logic bit while the copying apparatus misinterprets the combination of said one of the high logic bits and said copy-preventing signal as two high logic bits.

4. The remote controller as claimed in claim 3, wherein said means for inserting a copy-preventing signal is incorporated in said processor means.

5. The remote controller as claimed in claim 3, wherein said means for inserting a copy-preventing signal interconnects said processor means and said transmitting means.

* * * * *